(12) United States Patent
Blizard et al.

(10) Patent No.: US 6,169,122 B1
(45) Date of Patent: Jan. 2, 2001

(54) MICROCELLULAR ARTICLES AND METHODS OF THEIR PRODUCTION

(75) Inventors: Kent Blizard, Ashland; Kelvin T. Okamoto, Boston; Jere R. Anderson, Newburyport, all of MA (US)

(73) Assignee: Trexel, Inc., Woburn, MA (US)

( * ) Notice: Under 35 U.S.C. 154(b), the term of this patent shall be extended for 0 days.

(21) Appl. No.: 09/241,348

(22) Filed: Feb. 2, 1999

Related U.S. Application Data (63) Continuation-in-part of application No. PCT/US98/27118, filed on Dec. 18, 1998.
(60) Provisional application No. 60/068,173, filed on Dec. 19, 1997, and provisional application No. 60/107,754, filed on Nov. 10, 1998.

(51) Int. Cl.⁷ ........................................................ C08J 9/00
(52) U.S. Cl. ................................ 521/79; 521/81; 521/92; 521/142; 264/45.9
(58) Field of Search ................................ 521/79, 81, 142, 521/92; 264/45.9

(56) References Cited

U.S. PATENT DOCUMENTS

| | | |
|---|---|---|
| 3,227,664 | 1/1966 | Blades et al. . |
| 3,227,784 | 1/1966 | Blades et al. . |
| 3,277,221 | 10/1966 | Parrish . |
| 3,375,211 | 3/1968 | Parrish . |
| 3,375,212 | 3/1968 | Bonner . |
| 3,384,531 | 5/1968 | Parrish . |
| 3,491,032 | 1/1970 | Skochdopole et al. . |
| 3,584,090 | 6/1971 | Parrish . |
| 3,637,458 | 1/1972 | Parrish . |
| 3,787,543 | 1/1974 | Parrish . |
| 3,812,225 | 5/1974 | Hosoda et al. . |
| 4,473,665 | 9/1984 | Martini-Vvedensky et al. . |
| 4,627,177 | 12/1986 | Meyers . |
| 4,761,256 | 8/1988 | Hardenbrook et al. . |
| 4,791,144 | 12/1988 | Nagou et al. . |
| 4,832,770 | 5/1989 | Nojiri et al. . |
| 5,034,171 | 7/1991 | Kiczek et al. . |
| 5,110,998 | 5/1992 | Muschiatti . |
| 5,116,881 | 5/1992 | Park et al. . |
| 5,128,382 | 7/1992 | Elliott, Jr. et al. . |
| 5,149,579 | 9/1992 | Park et al. . |
| 5,158,986 | 10/1992 | Cha et al. . |
| 5,160,674 | 11/1992 | Colton et al. . |
| 5,180,751 | 1/1993 | Park et al. . |
| 5,182,307 | 1/1993 | Kumar . |
| 5,334,356 | 8/1994 | Baldwin et al. . |
| 5,358,675 | 10/1994 | Campbell et al. . |
| 5,468,530 | 11/1995 | Götz et al. . |
| 5,500,450 | 3/1996 | Simandl et al. . |
| 5,527,573 | 6/1996 | Park et al. . |
| 5,571,848 | 11/1996 | Mortensen et al. . |
| 5,670,102 | 9/1997 | Perman et al. . |
| 5,684,055 | 11/1997 | Kumar et al. . |
| 5,830,393 | 11/1998 | Nishikawa et al. . |
| 5,851,617 | * 12/1998 | Keiser . |
| 5,866,053 | 2/1999 | Park et al. . |
| 5,955,511 | 9/1999 | Handa et al. . |

FOREIGN PATENT DOCUMENTS

| | | |
|---|---|---|
| 0 707 935 A2 | 4/1996 | (EP) . |
| 0 799 853 A1 | 10/1997 | (EP) . |
| 0 818 292 A2 | 1/1998 | (EP) . |
| 1 456 171 | 11/1976 | (GB) . |
| WO 89/00918 | 2/1989 | (WO) . |
| WO 90/07546 | 7/1990 | (WO) . |
| WO 95/24440 | 9/1995 | (WO) . |
| WO 98/08667 | 3/1998 | (WO) . |
| WO 98/31521 | 7/1998 | (WO) . |
| 99/32544 | * 7/1999 | (WO) . |

OTHER PUBLICATIONS

Baldwin, Daniel F. "A Processing System for The Extrusion of Microcellular Polymer Sheets: Shaping and Cell Growth Control", Cellular and Microcellular Materials, 53:85–107, 1994.

Park et al., "Filamentary Extrusion of Microcellular Polymers Using a Rapid Decompressive Element", Polymer Engineering and Science, 36:34–48, 1996.

Park et al., "Effect of the Pressure Drop Rate on Cell Nucleation in Continuous Processing of Microcellular Polymers", Polymer Engineering and Science, 35:432–440, 1995.

\* cited by examiner

Primary Examiner—Morton Foelak
(74) Attorney, Agent, or Firm—Wolf, Greenfield & Sacks, P.C.

(57) ABSTRACT

Semi-crystalline microcellular foams that include a midlevel amount of nucleating agent, and methods of their production, are provided. The microcellular foams can be produced in typical polymer processing techniques such as extrusion, injection molding and blow molding. The foams exhibit excellent mechanical properties and can be formed over a broad range of density into a number of different foam articles.

21 Claims, 6 Drawing Sheets

MICROCELLULAR ARTICLES AND METHODS OF THEIR PRODUCTION

RELATED APPLICATIONS

This application is a continuation-in-part of PCT application Ser. No. PCT/US98/27118, filed Dec. 18, 1998, which claims priority to U.S. Provisional application Ser. No. 60/068,173, filed Dec. 19, 1997, and U.S. Provisional Patent application Ser. No. 60/107,754, filed Nov. 10, 1998, to which co-pending, commonly-owned patent application serial numbers 09/241,350 and 09/241,352, each filed Feb. 2, 1999, each claim priority.

FIELD OF INVENTION

The present invention relates generally to polymeric foams, and more particularly to microcellular foams including additives and methods for their production.

BACKGROUND OF THE INVENTION

Polymeric foams include a plurality of voids, also called cells, in a polymer matrix. By replacing solid plastic with voids, polymeric foams use less raw material than solid plastics for a given volume. Thus, by using polymeric foams in many applications instead of solid plastics, material costs are reduced.

Microcellular foams have smaller cell sizes and higher cell densities than conventional polymeric foams. Typically, microcellular foams are defined as having average cell sizes of less than 100 microns and a cell density of greater than $10^6$ cells/cm$^3$ of solid plastic. In a typical continuous process for forming microcellular foam (e.g. extrusion), the pressure on a single-phase solution of blowing agent and polymer is rapidly dropped to nucleate the cells. The nucleation rate must be high enough to form the microcellular structure.

Several patents describe aspects of microcellular materials and microcellular processes. U.S. Pat. No. 4,473,665 (Martini-Vvedensky, et al.; Sep. 25, 1984) describes a process for making foamed polymer having cells less than about 100 microns in diameter. In the technique of Martini-Vvedensky, et al., a material precursor is saturated with a blowing agent, the material is placed under high pressure, and the pressure is rapidly dropped to nucleate the blowing agent and to allow the formation of cells. The material then is frozen rapidly to maintain a desired distribution of microcells. U.S. Pat. No. 5,158,986 (Cha, et al.; Oct. 27, 1992) describes formation of microcellular polymeric material using a supercritical fluid as a blowing agent. In a batch process of Cha, et al., a plastic article is submerged at pressure in supercritical fluid for a period of time, and then quickly returned to ambient conditions creating a solubility change and nucleation. In a continuous process, a polymeric sheet is extruded, and then can be run through rollers in a container of supercritical fluid at high pressure, and then exposed quickly to ambient conditions. In another continuous process, a supercritical fluid-saturated molten polymeric stream is established. The polymeric stream is rapidly heated, and the resulting thermodynamic instability (solubility change) creates sites of nucleation, while the system is maintained under pressure preventing significant growth of cells. The material then is injected into a mold cavity where pressure is reduced and cells are allowed to grow.

International patent publication no. WO 98/08667 (Burnham et al.) provides methods and systems for producing microcellular material, and microcellular articles. In one method of Burnham et al., a fluid, single phase solution of a precursor of foamed polymeric material and a blowing agent is continuously nucleated by dividing the stream into separate portions and separately nucleating each of the separate portions. The divided streams can be recombined into a single stream of nucleated, fluid polymeric material. The recombined stream may be shaped into a desired form, for example, by a shaping die. Burnham et al. also describes a die for making advantageously thick microcellular articles, that includes a multiple pathway nucleation section. Other methods describe the fabrication of very thin microcellular products, as well. In particular, a method for continuously extruding microcellular material onto a wire, resulting in very thin essentially closed cell microcellular insulating coating secured to the wire, is provided. In some of the methods, pressure drop rate is an important feature and techniques to control this and other parameters are described.

Conventional foam processes, in some cases, incorporate nucleating agents, some of which are inorganic solid particles, into the polymer melt during processing. Such agents can be of a variety of compositions, such as talc and calcium carbonate. In particular, nucleating agents are incorporated into the polymer melt typically at levels less than 1% by weight of polymeric melt to lower the energy for cell nucleation. The dispersion of nucleating agents within the polymer mixture is often times critical in forming a uniform cell structure. In some cases, higher levels are not used because of the agglomeration of the particles which can lead to non-uniform cell structures having anomalous large cells. The following U.S. Patents describe the use of nucleating agents in foam processes.

U.S. Pat. No. 3,491,032 (Skochdopole et al.; Jan. 20, 1970) describes a process for making cellular polymer materials. In a process of Skochdopole, finally divided solid materials such as calcium silicate, zinc stearate, magnesium stearate and the like can advantageously be incorporated with the polymer or gel prior to expanding the same. Such finely divided materials aid in controlling the size of the cells, and are employed in amounts of from about 0.01% to about 2.0% by weight of the polymer.

U.S. Pat. No. 5,116,881 (Park et al.; May 26, 1992) describes polypropylene foam sheets and a process for their manufacture. In a process of Park, a nucleating agent, is used to create sites for bubble initiation. It is preferred that the nucleating agent have a particle size in the range of 0.3 to 5.0 microns and that its concentration be less than one part per hundred parts polymer by weight. Concentrations of nucleating agents greater than five parts per hundred parts polymer by weight leads to agglomeration, or insufficient dispersion of nucleating substance so that the diameter of the cell size becomes greater.

Fillers in polymeric foams are typically added in amounts of at least 20% by weight polymeric material, and in many cases greater than 30% by weight. In international patent publication no. WO 98/08667 (Burnham et al.) described above, Burnham describes examples of microcellular material that include filler levels in an amount of at least 10% by weight polymeric material, other examples include filler levels in an amount of at least about 25% by weight polymeric material, other examples include filler levels in an amount of at least about 35% by weight polymeric material, and still other examples include filler levels of at least about 50% by weight polymeric material.

Though nucleating agents have been used in low weight percentages in the production of foams and fillers have been used in high weight percentages in the production of conventional foams and microcellular foams, foam processes typically have not employed a midlevel amount of nucleating agent.

SUMMARY OF THE INVENTION

The present invention provides a process for producing a foam, and a microcellular foam, that includes a midlevel amount of nucleating agent. The microcellular foams can be produced in typical polymer processing techniques such as extrusion, injection molding and blow molding. The foams exhibit excellent mechanical properties and can be formed over a broad range of density into a number of different foam articles.

One aspect of the invention provides a method of forming a microcellular article. The method includes conveying polymeric material in a downstream direction in a polymer processing apparatus. The polymeric material includes a semicrystalline polymer, and a nucleating agent in an amount between about 2.5 and about 7 weight percent by weight of the polymeric material. The method further includes forming a microcellular article from the polymeric material.

In certain embodiments of this aspect, the process further includes the step of introducing blowing agent into the polymeric material in the polymer processing apparatus in an amount less than 1.5 weight percent by weight of the polymeric material, to form a solution of blowing agent and polymeric material. In certain embodiments, the process further includes the step of inducing a pressure drop rate of less than 1.0 GPa/s in the solution of blowing agent and polymeric material.

In another aspect, the invention provides a microcellular polymeric article including a matrix of polymeric material including a plurality of cells and having an average cell size of less than about 60 microns. The polymeric material includes a semicrystalline polymer and a nucleating agent in an amount between about 2.5 and about 7 weight percent, by weight of the polymeric material.

Among other advantages, certain embodiments of the invention provide a viable process for producing the microcellular foam articles with low blowing agent percentages and/or low pressure drop rates due to the presence of the nucleating agent. Using low blowing agent percentages results in cost savings associated with the blowing agent and also may improve the surface quality of resulting microcellular articles. Employing low pressure drop rates as opposed to high pressure drop rates generally permits greater freedom in die design and, in some cases, allows for the production of foam articles at thicker cross-sectional dimensions.

Different embodiments of the invention also provide processes for the production of a variety of different types of foam articles, for example, extruded articles, blow molded articles, and injection molded articles, from a variety of different semi-crystalline polymeric materials.

Furthermore, the invention provides a microcellular foam that includes nucleating agents at high enough levels, between 2.5% and 7% by weight polymeric material, to effectively function as filler that replaces solid plastic in a non-negligible amount. Replacing solid plastic with these agents can result in material cost savings and mechanical property enhancement.

In addition, in many cases the microcellular foams have uniform and fine cell structures despite the presence of the a midlevel amount of nucleating agents. The interconnectivity between cells is minimal, in many embodiments. Also, the foams can be produced over a range of densities. In particular, relatively high density foams can be produced having properties comparable to the solid, unfoamed plastic.

Other features and advantages will be apparent from the following description.

DETAILED DESCRIPTION OF THE INVENTION

Commonly owned, co-pending international patent publication no. WO 98/08667 published Mar. 5, 1998, commonly owned, co-pending international patent publication no. WO 98/31521 published Jul. 23, 1998, commonly owned, co-pending U.S. provisional patent application Ser. No. 60/068,173 entitled "Microcellular Extrusion/Blow Molding Process and Article Made Thereby", filed Dec. 19, 1997, commonly owned, co-pending U.S. provisional patent application Ser. No. 60/107,754 entitled "Microcellular Extrusion/Blow Molding Process and Article Made Thereby", filed Nov. 10, 1998, all are incorporated by reference.

The various embodiments and aspects of the invention will be better understood from the following definitions. As used herein, "nucleation" defines a process by which a homogeneous, single-phase solution of polymeric material, in which is dissolved molecules of a species that is a gas under ambient conditions, undergoes formations of clusters of molecules of the species that define "nucleation sites", from which cells will grow. That is, "nucleation" means a change from a homogeneous, single-phase solution to a multi-phase mixture in which, throughout the polymeric material, sites of aggregation of at least several molecules of blowing agent are formed. Thus "nucleation sites" do not define locations, within a polymer, at which nucleating agent particles reside. "Nucleated" refers to a state of a fluid polymeric material that had contained a single-phase, homogeneous solution including a dissolved species that is a gas under ambient conditions, but, following a nucleating event (typically thermodynamic instability) contains nucleation sites. "Non-nucleated" refers to a state defined by a homogeneous, single-phase solution of polymeric material and dissolved species that is a gas under ambient conditions, absent nucleation sites. A "non-nucleated" material can include nucleating agent such as talc.

A "nucleating agent" is a dispersed agent, such as talc or other filler particles, added to a polymer and able to promote formation of nucleation sites from a single-phase, homogeneous solution. A "filler" is a dispersed particle added to replace solid plastic.

The present invention provides a semi-crystalline microcellular foam having a midrange level of nucleating agent. The foam includes between about 2.5 weight percent and about 7 weight percent of these agents. In certain embodiments, the foam includes between about 3 and about 7 weight percent nucleating agent, and in some embodiments between about 5 weight percent and about 7 weight percent nucleating agent. The level nucleating agent in the present foam is, generally, greater than the levels used as nucleating agents, flame retardents, or pigments in conventional foam processing.

The nucleating agents can be any of a variety of materials and in any number of forms, as known in the art. In certain embodiments, the nucleating agents are inorganic solids such as those commonly used in the art, for example talc, calcium carbonate ($CaCO_3$), titanium oxide ($TiO_2$), barium sulfate ($BaSO_4$), and zinc sulfide ($ZnS$). In certain embodiments, organic solids, such as cellulosic fibers, may also function as nucleating agents. The foams, in some cases, may include more than one type of nucleating agent such that the sum total of all of the nucleating agents is between about 2.5 weight percent and 7 weight percent. In particular, microcellular foams including both talc and titanium oxide have been produced.

Typically, the nucleating agents are particles, though in some cases the nucleating agents may be fibrous or have other forms. The nucleating particles can have a variety of shapes such as spherical, cylindrical, or planar. Generally, the particles have a size in the range of about 0.01 microns to about 10 microns, and more typically between about 0.1 microns and 1.0 microns. In some embodiments, the particles may be surface treated with a surfactant to enhance dispersibility within polymer melt and to prevent particle agglomeration.

In some cases, the nucleating agents, depending on their composition, may also function as pigments, flame retardents or any other typical additive. In the 2.5–7 weight percent range, the agents also function as fillers. That is, the nucleating agents replace solid plastic in a non-negligible amount which, in certain embodiments, leads to cost savings because filler is less expensive than the solid plastic. In certain embodiments, the agents also may enhance the mechanical properties of the microcellular foam. In some cases, the particles may enhance crystallinity.

The present microcellular foam can be composed, at least in part, of any semi-crystalline polymer. Typical semi-crystalline polymers include, but are not limited to, the following materials: polyethylene terephthalate (PET), polylactic acid, nylon 6, nylon 6/6, polyethylene, polypropylene, syndiotactic polystyrene, and polyacetal. In certain cases, the semi-crystalline polymer may be blended with non-semi-crystalline polymers. The semi-crystalline polymer may also be blended with other semi-crystalline polymers. In preferred cases, the semi-crystalline material is a polyolefin. In some cases, the semi-crystalline material is polypropylene. Polypropylene may be present as one of multiple polymeric components. In other embodiments, the polymeric material can consist essentially of polypropylene, that is, the polymeric material includes no other polymer components other than polypropylene, but may include other additives, as described further below, in addition to the nucleating agent. In another set of preferred embodiments the semi-crystalline material is high-density polyethylene, that is polyethylene having a density of greater than 0.94 $g/cm^3$. High-density polyethylene, in some cases, is present as one of multiple polymeric components. In preferred cases, the weight percentage of high-density polyethylene is greater than 80% by weight polymeric material. In some preferred cases, the weight percentage of high-density polyethylene is greater than 90% by weight polymeric material. In a particularly preferred case the polymeric material consists essentially of high density polyethylene, that is, the polymeric material includes no other polymer components other than high-density polyethylene, but may include other additives, as described further below, in addition to the nucleating agent.

Optionally, the foam composition may also include other additives, as known in the art, in addition to the nucleating agents. Such additives may be processing aids such as plasticizers (e.g. low-molecular weight organic compounds), lubricants, flow enhancers, and anti-oxidants. In many preferred cases, the polymeric material is essentially free of residual chemical blowing agents and reaction by products because only physical blowing agents are used in the process. In particular, many high-density polyethylene foams are essentially free of residual chemical blowing agents and reaction by-products.

Surprisingly, even though the amount of nucleating agent is greater than 2.5 weight percent, the foams have a relatively uniform and fine cell structure. The nucleating agents have not led to the presence of anomalous large cells in the foams. Foam articles, according to the invention, have an average cell size of less than about 60 microns. In certain particularly preferred embodiments, the average cell size is less than about 50 microns. In some embodiments particularly small cell size is desired, and in these embodiments material of the invention has average cell size of less than about 20 microns, more preferably less than about 10 microns, and more preferably still less than about 5 microns. The microcellular material preferably has a maximum cell size of about 100 microns. In embodiments where particularly small cell size is desired, the material can have maximum cell size of about 50 microns, more preferably about 25 microns, and more preferably still about 15 microns. A set of embodiments includes all combinations of these noted average cell sizes and maximum cell sizes. For example, one embodiment in this set of embodiments includes microcellular material having an average cell size of less than about 30 microns with a maximum cell size of about 50 microns, and as another example an average cell size of less than about 30 microns with a maximum cell size of about 35 microns, etc. That is, microcellular material designed for a variety of purposes can be produced having a particular combination of average cell size and a maximum cell size preferable for that purpose.

The cell structure of the microcellular foam, preferably, is a closed cell structure. A substantially closed cell structure has limited interconnection between adjacent cells and generally, is meant to define material that, at a thickness of about 200 microns, contains no connected cell pathway through the material. It is believed that the closed cell structure may, advantageously, contribute to enhancing the mechanical properties of the foam due to the absence of a long interconnected pathway which could act as a site that leads to premature failure of the material.

In accordance to the invention, microcellular foams can be produced over a wide range of densities. In many embodiments, the void volume is greater than 10%, in other embodiments greater than 20%, and in still other embodiments greater than 50%. In another set of embodiments, the microcellular foam has a void volume of less than 50%, and in some embodiments less than 30%. In a particularly preferred embodiment, the microcellular foam has a void volume between about 10% and about 50%. Foams within this preferred void volume range (10% to 50%) exhibit excellent mechanical properties such as tensile strength and tensile modulus, while still having a significant density reduction from the solid plastic.

An unlimited variety of semicrystalline microcellular foam articles are envisioned. Articles may be extruded, blow molded, injection molded into an unlimited number of shapes and forms. Extruded sheet can also be thermoformed. The foamed articles, in certain embodiments, are generally thinner than conventional foam articles because the cell sizes in the microcellular foam articles are smaller than the cell sizes in conventional foams. In certain cases, the articles have at least one portion having a thickness of less than 0.1 inch, in other cases less than 0.05 inch, and in other cases less than 0.01 inch. In many cases, the microcellular foam articles have a desirable surface quality because the articles can be produced with low blowing agent percentages, thus limiting the amount of gas that diffuses through the foam surface. As is known in the field of microcellular foam processing, large quantities of gas that diffuse through the surface can lead to surface roughness and imperfections, in some cases.

Figure 1:
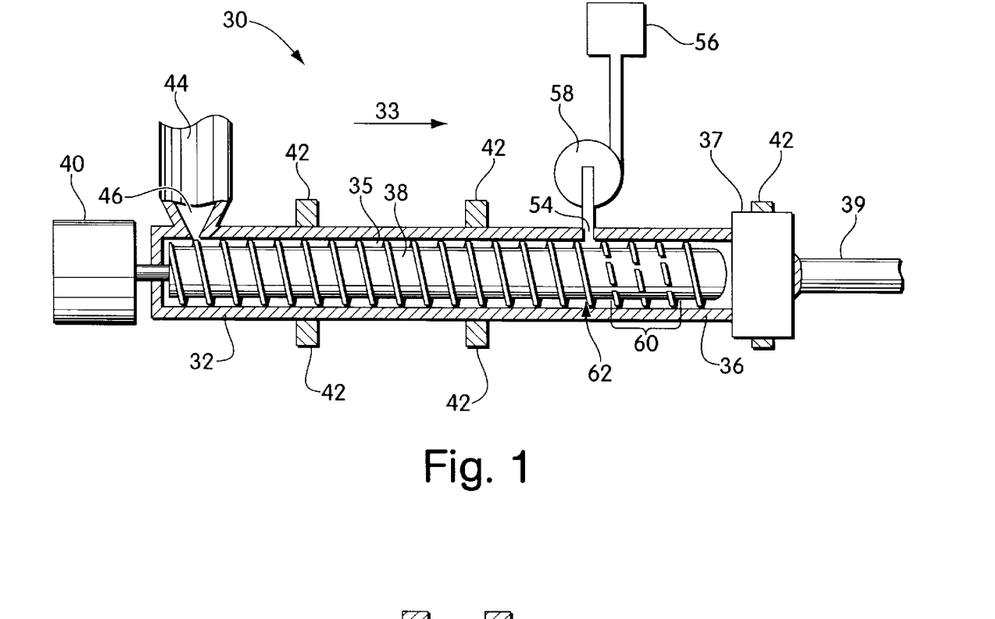
FIG. 1 illustrates an extrusion system for producing microcellular foam.

Referring to FIG. 1, an extrusion system 30 for the production of microcellular foam having a midlevel amount of nucleating agent is illustrated schematically. As described further below, the presence of the nucleating agents in the 2.5–7% by weight range results in several processing advantages. The extrusion system includes a screw 38 that rotates within a barrel 32 to convey, in a downstream direction 33, polymeric material in a processing space 35 between the screw and the barrel. The polymeric material is extruded through a die 37 fluidly connected to processing space 35 and fixed to a downstream end 36 of barrel 32. Die 37 is configured to form an extrudate 39 of microcellular foam in the desired shape, as described further below.

Typically, the polymeric material is gravity fed into polymer processing space 35 through orifice 46 from a standard hopper 44. The polymeric material, generally, is in pelletized form. Though the polymeric material can include any variety of semi-crystalline materials or blends thereof, preferably the polymeric material includes a polyolefin such as polypropylene and high-density polyethylene.

As well known in the art, in some cases, the nucleating agent may be added in a concentrate blend with the semi-crystalline polymer in pellet form. That is, nucleating agent particles are dispersed in pellets of semicrystalline polymer in concentrated percentages, for example 40% by weight. The concentrated pellets are blended with suitable amounts of semicrystalline pellets to produce a polymeric material having between 2.5 and 7 weight percent nucleating agent. In this fashion, the percentage of talc in the polymeric material composition can be adjusted by controlling the ratio of concentrate to pure polymer pellets. In other embodiments, also well known to those skilled in the art, nucleating agents in particulate form may be added directly to the polymeric material. Any other techniques well known in the art may also be employed for incorporating the nucleating agents into the polymer composition in controllable amounts.

Extrusion screw 38 is operably connected, at its upstream end, to a drive motor 40 which rotates the screw. Although not shown in detail, extrusion screw 38 includes feed, transition, gas injection, mixing, and metering sections as described further below.

Positioned along extrusion barrel 32, optionally, are temperature control units 42. Control units 42 can be electrical heaters, can include passageways for temperature control fluid, or the like. Units 42 can be used to heat a stream of pelletized or fluid polymeric material within the extrusion barrel to facilitate melting, and/or to cool the stream to control viscosity, skin formation and, in some cases, blowing agent solubility. The temperature control units can operate differently at different locations along the barrel, that is, to heat at one or more locations, and to cool at one or more different locations. Any number of temperature control units can be provided. Temperature control units 42 can also optionally be used to heat die 37.

From hopper 44 pellets are received into the feed section of screw and conveyed in a downstream direction in polymer processing space 35 as the screw rotates. Heat from extrusion barrel 32 and shear forces arising from the rotating screw, act to soften the pellets within the transition section. Typically, by the end of the first mixing section the softened pellets have been gelated, that is welded together to form a uniform fluid stream substantially free of air pockets.

The blowing agent is introduced into the polymer stream through a port 54 in fluid communication with a source 56 of a physical blowing agent. The port can be positioned to introduce the blowing agent at any of a variety of locations along the extrusion barrel 32. Preferably, as discussed further below, the port introduces blowing agent at the gas injection section of the screw, where the screw includes multiple flights.

Any of a wide variety of physical blowing agents known to those of ordinary skill in the art such as hydrocarbons, chlorofluorocarbons, nitrogen, carbon dioxide, and the like can be used in connection with this embodiment of the invention. According to a preferred embodiment, source 56 provides carbon dioxide as a blowing agent. In another preferred embodiment, source 56 provides nitrogen as a blowing agent. In particularly preferred embodiments solely carbon dioxide or nitrogen is respectively used. A pressure and metering device 58 typically is provided between blowing agent source 56 and port 54. Blowing agents that are in the supercritical fluid state in the extruder are especially preferred, in particular supercritical carbon dioxide and supercritical nitrogen.

Device 58 can be used to meter the blowing agent so as to control the amount of the blowing agent in the polymeric stream within the extruder to maintain a level of blowing agent at a level. In a preferred embodiment, device 58 meters the mass flow rate of the blowing agent. The blowing agent is generally less than about 15% by weight of polymeric stream and blowing agent. Surprisingly, in some embodiments, it has been discovered that the present microcellular semicrystalline foam using relatively low blowing agent percentages. The presence of the nucleating agent is believed to enhance the driving force for nucleation thus enabling the production of microcellular foam at low blowing agent percentages, for example less than 1.5 percent blowing agent by weight of polymeric stream and blowing agent. In preferred embodiments, the process involves adding less than 1.0 weight percent blowing agent, and in other preferred cases, the process involves adding less than 0.5 percent, by weight of polymeric stream and blowing agent, while in other embodiments the process involves adding less than 0.1 percent, by weight of polymeric stream and blowing agent.

Figure 2:
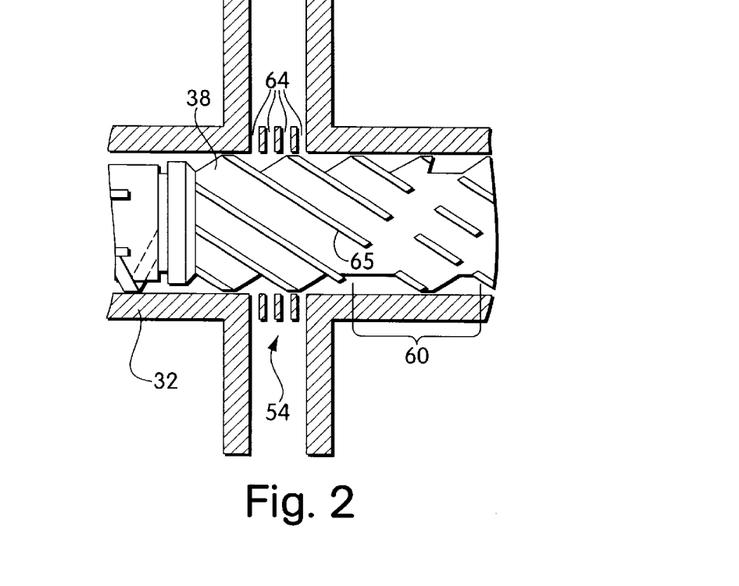
FIG. 2 illustrates a multihole blowing agent feed orifice arrangement and extrusion screw.

Referring now to FIG. 2, a preferred embodiment of the blowing agent port is illustrated in greater detail and, in addition, two ports on opposing top and bottom sides of the barrel are shown. In this preferred embodiment, port 54 is located in the gas injection section of the screw at a region upstream from mixing section 60 of screw 38 (including highly-broken flights) at a distance upstream of the mixing section of no more than about 4 full flights, preferably no more than about 2 full flights, or no more than 1 full flight. Positioned as such, injected blowing agent is very rapidly and evenly mixed into a fluid polymeric stream to promote production of a single-phase solution of the foamed material precursor and the blowing agent.

Port 54, in the preferred embodiment illustrated, is a multi-hole port including a plurality of orifices 64 connecting the blowing agent source with the extruder barrel. As shown, in preferred embodiments a plurality of ports 54 are provided about the extruder barrel at various positions radially and can be in alignment longitudinally with each other. For example, a plurality of ports 54 can be placed at the 12 o'clock, 3 o'clock, 6 o'clock, and 9 o'clock positions about the extruder barrel, each including multiple orifices 64. In this manner, where each orifice 64 is considered a blowing agent orifice, the invention includes extrusion apparatus having at least about 10, preferably at least about 40, more preferably at least about 100, more preferably at least about 300, more preferably at least about 500, and more preferably still at least about 700 blowing agent orifices in fluid communication with the extruder barrel, fluidly connecting the barrel with a source of blowing agent.

Also in preferred embodiments is an arrangement (as shown in FIG. 2) in which the blowing agent orifice or orifices are positioned along the extruder barrel at a location where, when a preferred screw is mounted in the barrel, the orifice or orifices are adjacent full, unbroken flights 65. In this manner, as the screw rotates, each flight, passes, or "wipes" each orifice periodically. This wiping increases rapid mixing of blowing agent and fluid foamed material precursor by, in one embodiment, essentially rapidly opening and closing each orifice by periodically blocking each orifice, when the flight is large enough relative to the orifice to completely block the orifice when in alignment therewith. The result is a distribution of relatively finely-divided, isolated regions of blowing agent in the fluid polymeric material immediately upon injection and prior to any mixing. In this arrangement, at a standard screw revolution speed of about 30 rpm, each orifice is passed by a flight at a rate of at least about 0.5 passes per second, more preferably at least about 1 pass per second, more preferably at least about 1.5 passes per second, and more preferably still at least about 2 passes per second. In preferred embodiments, orifices 54 are positioned at a distance of from about 15 to about 30 barrel diameters from the beginning of the screw (at upstream end 34).

Referring again to FIG. 1, a mixing section of screw 38, following the gas injection section, is constructed to mix the blowing agent and polymer stream to promote formation of a single phase solution of blowing agent and polymer. The mixing section includes unbroken flights which break up the stream to encourage mixing. Downstream the mixing section, a metering section builds pressure in the polymer-blowing agent stream prior to die 37.

Die 37 includes inner passageways (not shown) connected to polymer processing space 35 through which the polymer stream flows. The shape and dimensions of the internal passageways, known as die geometry, control the shape of extrudate 39. Die 37 can have any variety of configurations, as is well known in the art, to produce microcellular foam in specific forms, for example sheets, profiles, or strands. In particularly preferred embodiments, dies described in international patent publication no. WO 98/08667, which is incorporated herein by reference, are used.

In addition to shaping extrudate 39, die 37 may also perform the function of nucleating the polymer and blowing agent single-phase solution. The pressure in the single phase solution drops as the solution flows through the internal passageways of the die. This pressure drop causes the solubility of the blowing agent in the polymer to decrease, which is the driving force for the cell nucleation process. The extent of pressure drop depends upon the dimensions of the passageway. Specifically the dimensions that effect pressure drop include the shape of the passageway, the length of the passageway, and the thickness of the passageway. Typically, the geometry of the die is designed, as is known in the art, to give a pressure drop suitable for cell nucleation in accordance to microcellular foam requirements. Under processing conditions, the pressure drop across die 37 is generally greater than 1,000 psi, preferably greater than 2,000 psi, and more preferably greater than 3,000 psi.

In some embodiments, die 37 is also configured, as known in the art, to provide a pressure drop rate (dP/dt) as the single-phase solution flows across the passageway. Pressure drop rate, which depends upon die geometry and flow rate, also effects the cell nucleation process. Typically, a sufficient pressure drop rate must be induced to achieve appropriate nucleation conditions for microcellular material. The presence of the nucleating agent at an amount between 2.5–7% by weight is believed to lower the pressure drop rate required. In certain cases, it is desirable to use a process that employs low pressure drop rates. Lower pressure drop rates, generally, allow for more freedom in die construction and resulting article dimensions. In certain embodiments, the pressure drop rate in the solution is less than 1.0 GPa/s, in some embodiments less than 0.10 GPa/s, and, in some embodiments less than 0.05 GPa/s. In other embodiments, higher pressure drop rates are utilized, for example, in the production of certain thin products. In some cases, the pressure drop rate is greater than 1.0 GPa/s, in others greater than 5.0 GPa/s, and in others greater than 10.0 GPa/s.

In another embodiment, not illustrated, the pressure drop rate is induced in at least one nucleating pathway prior to or within the die 37. Such configurations are described in co-pending international patent publication no. WO 98/08667 published Mar. 5, 1997 and incorporated herein by reference.

As a result of elevated temperatures, extrudate 39 is typically soft enough so that the nucleated cells grow. As the extrudate cools in the atmosphere and becomes more solid, cell growth is restricted. In certain embodiments, it is advantageous to provide external cooling means to speed the cooling rate of the extrudate. For example, in these embodiments, cooling may be accomplished by blowing air on the extrudate, contacting the extrudate with a cool surface, or submerging the extrudate in a liquid medium.

Other equipment (not illustrated) downstream of the die is used, as required, for additional shaping of the extrudate into a final form.

It should be understood that the above described system and process is not limiting. Modifications, well-known in the art, can be made to the system and process in various embodiments of the invention.

Figure 3:
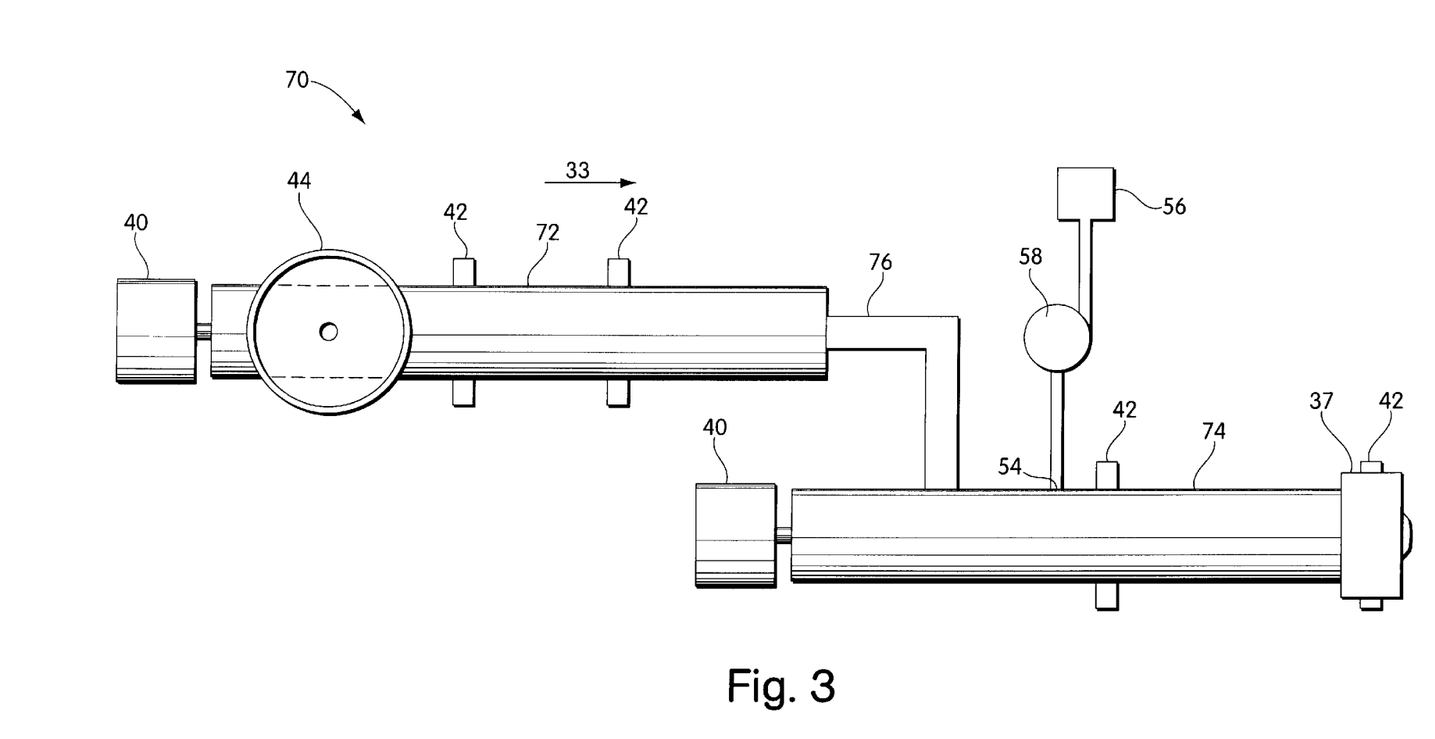
FIG. 3 illustrates an alternative embodiment of an extrusion system for producing microcellular foam.

Referring to FIG. 3, an alternative extrusion system 70 for producing microcellular foam in accordance with the invention includes a tandem extruder line. The tandem line includes a primary extruder 72 and a secondary extruder 74 arranged in parallel configuration and connected through a transfer pipe 76. As described above, pellets are supplied into the primary extruder through hopper 44. In some embodiments, the secondary extruder includes blowing agent injection port 54, as illustrated. In other embodiments, the primary extruder includes the blowing agent injection port.

In other embodiments, the systems of FIGS. 1 and 3 are modified, as known in the art, to function as injection molding systems. Particularly preferred injection molding systems are described in U.S. patent application Ser. No. 60/068,350, which is incorporated by reference. Generally, injection molding systems do not include an extrusion die 37, but rather include a pathway fluidly connected to the polymer processing space through which the polymer and blowing agent solution is injected into the mold.

In other embodiments, the systems of FIGS. 1 and 3 are modified, as known in the art, to function as blow molding systems. Particularly preferred blow molding systems are described in U.S. patent application Ser. No. 60/068,173, which is incorporated by reference. Generally, blow molding systems employ parison forming dies and a blow mold that receives the parison of microcellular material out of the die.

It should be understood that any of the above described embodiments may be suitably combined with one another.

The following non-limiting examples illustrate additional embodiments of the invention.

EXAMPLE 1

Extrusion of Microcellular Polypropylene Material Without Filler

A tandem extrusion line (Akron Extruders, Canal Fulton, Ohio) was arranged including a 2.5 inch, 32/1 L/D primary extruder and a 3.0 inch, 34/1 L/D secondary extruder. An injection system for injection of $CO_2$ into the primary was placed at a distance of approximately 20 diameters from the feed section. The injection system included 4 equally-spaced circumferentially, radially-positioned ports, each port including 176 orifices, each orifice of 0.02 inch diameter, for a total of 704 orifices.

The primary extruder was equipped with a two-stage screw including conventional first-stage feed, transition, and metering sections, followed by a multi-flighted (four flights) mixing section for blowing agent dispersion. The screw was designed for high-pressure injection of blowing agent with minimized pressure drop between the first-stage metering section and point of blowing agent injection. The mixing section included 4 flights unbroken at the injection ports so that the orifices were wiped (opened and closed) by the flights. At a screw speed of 80 RPM each orifice was wiped by a flight at a frequency of 5.3 wipes per second. The mixing section and injection system allowed for very rapid establishment of a single-phase solution of blowing agent and polymeric material.

The injection system included air-actuated control valve to precisely meter a mass flow rate of blowing agent at rates from 0.2 to 12 lbs/hr at pressures up to 5500 psi.

The secondary extruder was equipped with a deep channel, three-flighted cooling screw with broken flights, which provided the ability to maintain a pressure profile of microcellular material precursor, between injection of blowing agent and entrance to the point of nucleation (the die, in this case) varying by no more than about 1500 psi, and in most cases considerably less.

The system included instrumentation allowing measurement of pressure and temperature of the melt stream at least six locations throughout the tandem system between a location just prior to the blowing agent injection ports to the point of entry into the die to precisely monitor material conditions. Along the screw, melt temperature was measured with infrared equipment to avoid disruption of the melt stream.

PP pellets were gravity-fed from a hopper into the extrusion system. The grade used was a standard homopolymer resin, Montell's 6823, having a nominal melt flow index of 0.5 g/10 min. The polymeric material was essentially free of nucleating agent. Primary screw speed was 90 RPM, giving a total output of approximately 84 lbs/hr of material. Secondary screw speed was 5 RPM. Barrel temperatures of the secondary extruder were set to maintain a melt temperature of 386 deg. F. measured at the end of the secondary extruder. $CO_2$ blowing agent was injected at a rate of 4.0 lbs/hr resulting in 4.8% blowing agent in the melt. A die adapter at the discharge of the secondary extruder was connected to a flat sheet T-type die having a die exit of 4.5 inches width and gap of 0.034 inch. A separate nucleator of constantly decreasing gap to an exit dimension of 0.015 inch was positioned within 0.5 inches of the die exit. The die had both melt and pressure indicators. Pressure profile between the injection ports and the inlet of the die was maintained between 2120 and 3490 psi.

Figure 4:
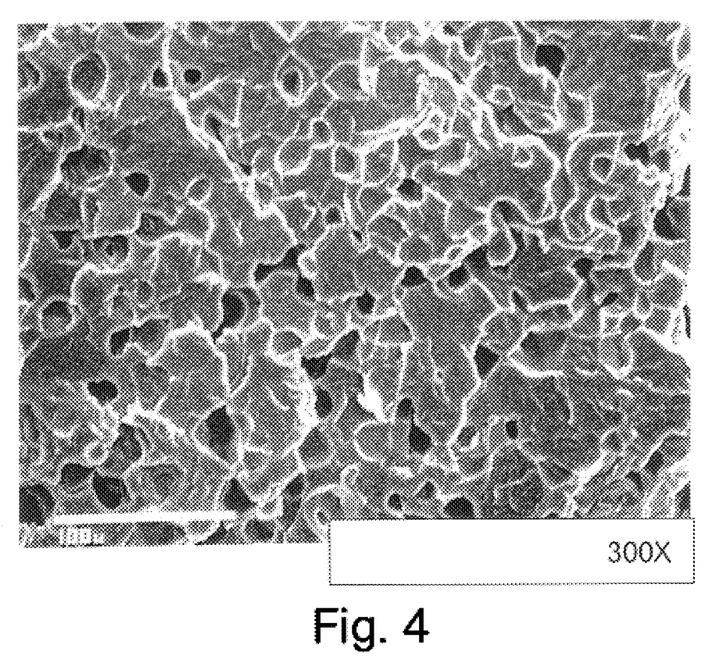
FIG. 4 is a photocopy of an SEM micrograph of a cross-section of the material produced in Example 1.

FIG. 4 is a photocopy of an SEM image of the cross section of the sheet showing a uniform dispersion of cells having an average diameter of about 25 microns. The sheet had an approximate thickness of 0.033 inch (0.83 mm). The density of the microcellular foam was approximately 0.63 $g/cm^3$ (39 $lbs/ft^3$).

EXAMPLE 2

Extrusion of Microcellular Polypropylene Sheet Without Filler

The same extrusion system, die, and polypropylene grade as described above in Example 1 was used for this example. The polymeric material was essentially free of nucleating agent. Primary screw speed was 75 RPM, giving a total output of approximately 60 lbs/hr of material. Secondary screw speed was 20 RPM. Barrel temperatures of the secondary extruder were set to maintain a melt temperature of 358 deg. F. measured at the end of the secondary extruder. $CO_2$ blowing agent was injected at a rate of 2.5 lbs/hr resulting in 4.2% blowing agent in the melt. Pressure profile between the injection ports and the inlet of the die was maintained between 2180 psi and 3650 psi.

Figure 5:
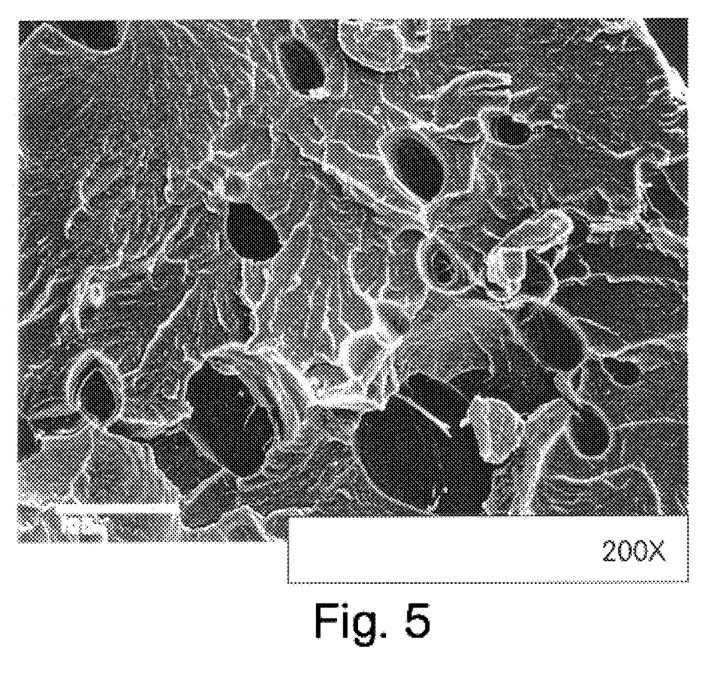
FIG. 5 is a photocopy of an SEM micrograph of a cross-section of the material produced in Example 2.

The sheet was taken up using a standard three roll stack, maintained at a temperature of 100 deg. F. using circulating oil. The take up speed was about 30 ft/min, to give a final sheet thickness of approximately 0.036 inch (0.93 mm). FIG. 5 is a photocopy of an SEM image of the cross section of the sheet, showing a non-uniform, generally non-microcellular structure. The average cell size was about 65 microns, with maximum size of 120 microns diameter. Material density was measured to be 0.79 $g/cm^3$ (49.3 $lbs/ft^3$).

The larger average cell size of the sheet produced in Example 2 compared to the sheet produced in Example 1 is due, in large part, to the lower blowing agent concentration used in Example 2 without the use of a nucleating agent.

EXAMPLE 3

Extrusion of Microcellular Polypropylene Sheet Having Talc Filler

Using the same polypropylene material and extrusion system as described in Example 1, PP pellets were gravity-fed from a hopper into the extrusion system. Primary screw speed was 48 RPM, giving a total output of approximately 100 lbs/hr of material. Secondary screw speed was 16 RPM. An auger type feeder was used to feed a talc/PP pellet concentrate (EP5140 A1 from Spartech Polycom) into the hopper. The screw speed on the auger was set to deliver 12.5 lb/hr of talc concentrate into the hopper. This rate corresponded to 12.5% by weight based on the total material output. Since this concentrate was 40% by weight of talc, the resultant formulation contained about 5% talc. Barrel temperatures of the secondary extruder were set to maintain a melt temperature of 424 deg. F. measured at the end of the secondary extruder. $CO_2$ blowing agent was injected at a rate of 0.5 lbs/hr resulting in 0.5% blowing agent in the melt. Pressure profile between the injection ports and the inlet of the die was maintained between 1580 psi and 1900 psi. The die placed at the end of the secondary extruder was a t-type flat die having an opening of 11 inches in width by 0.030 inch gap. The die lips were parallel, having a 0.5 inch final land length. The pressure drop rate across the die lips was 0.07 GPa/s.

Figure 6:
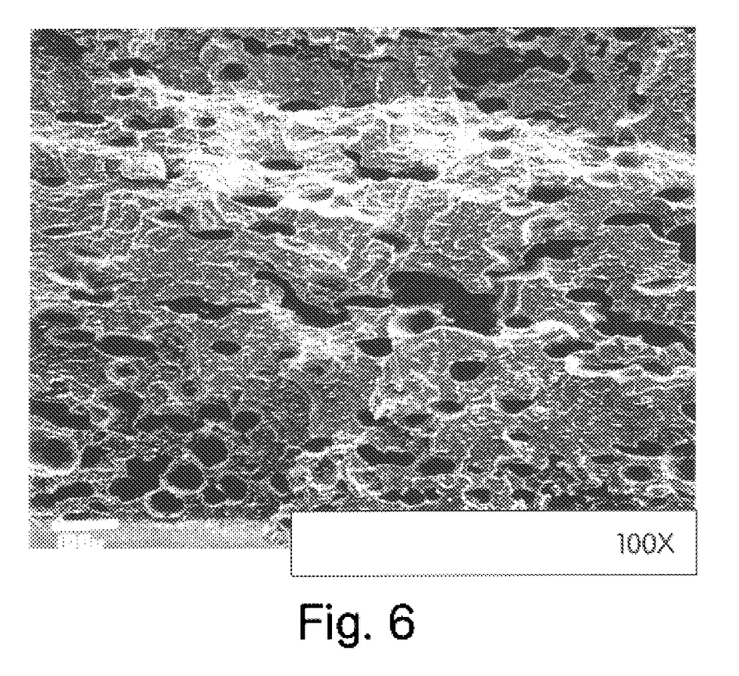
FIG. 6 is a photocopy of an SEM micrograph of a cross-section of the material produced in Example 3.

Using the same three roll stack maintained at 100 deg. F, the sheet was taken up at 11.4 ft/min, resulting in a sheet thickness of 0.038 inch (0.97 mm). FIG. 6 is a photocopy of an SEM image of the cross section of the sheet, showing fairly uniform, primarily closed cells of an average of about 50 microns diameter. The resultant sheet density was 0.71 g/cc (44.3 lbs/ft³).

Example 3 illustrates the production of microcellular polypropylene, including a mid-level range of talc as a nucleating agent, using a relatively low gas percentage and a relatively low pressure drop rate.

EXAMPLE 4

Extrusion of Microcellular Polypropylene Sheet Having Talc and Titanium Dioxide Fillers The system identical to that described in Example 3 was used, except that a titanium dioxide/PP concentrate was hand mixed with the talc concentrate in a ratio of four parts talc concentrate to one part titanium dioxide ($TiO_2$) concentrate. Since the titanium dioxide concentrate also had about 40% by weight of $TiO_2$, this filler consisted of approximately 80% talc and 20% $TiO_2$. Primary screw speed was 48 RPM, giving a total output of approximately 100 lbs/hr of material. The blend of concentrate pellets was fed by the auger feeder at a rate of 12.5 lb/hr, resulting in a final formulation containing 5% nucleating agent in the PP matrix.

Barrel temperatures of the secondary extruder were set to maintain a melt temperature of 424 deg. F. measured at the end of the secondary extruder. $CO_2$ blowing agent was injected at a rate of 0.6 lbs/hr resulting in 0.6% blowing agent in the melt. Pressure profile between the injection ports and the inlet of the die was maintained between 1550 psi and 1900 psi. The die placed at the end of the secondary extruder was identical in all respects to that described in Example 3. The pressure drop rate across the die lips was about 0.07 GPa/s.

Figure 7:
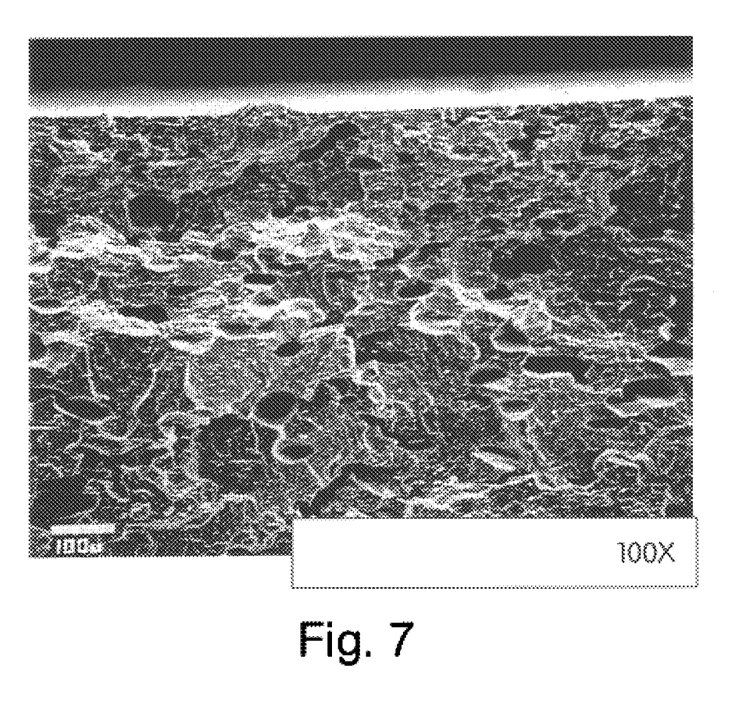
FIG. 7 is a photocopy of an SEM micrograph of a cross-section of the material produced in Example 4.

Using the same three roll stack, a take up speed of 11.7 ft/min resulted in a sheet thickness of 0.040 inch (1.0 mm) and had a density of 0.73 g/cc (45.6 lbs/ft³). FIG. 7 is a photocopy of an SEM image of the cross section of the sheet, showing fairly uniform, primarily closed cells of an average of about 40 microns diameter.

Example 4 illustrates the production of microcellular polypropylene, including talc and $TiO_2$ as nucleating agents.

EXAMPLE 5

Microcellular Polypropylene 5% Talc Filled Tubular Product

An NRM (Pawcatuck, Conn.) 2.5 inch 44/1 L/D long single extrusion line was equipped with an injection system for injection of $CO_2$ placed at a distance of approximately 25 diameters from the feed section. The injection system included 4 equally-spaced circumferentially, radially-positioned ports, each port including 417 orifices, each orifice of 0.02 inch diameter, for a total of 1668 orifices.

The extruder was equipped with a two-stage screw including conventional first-stage feed, barrier flight transition, and metering sections, followed by a multi-flighted (six flights) mixing section for blowing agent dispersion. The screw was designed for high-pressure injection of blowing agent with minimized pressure drop between the first-stage metering section and point of blowing agent injection. The second stage of the screw included a mixing section having 6 flights unbroken at the injection ports so that the orifices were wiped (opened and closed) by the flights. At a screw speed of 80 RPM each orifice was wiped by a flight at a frequency of 8 wipes per second. The mixing section and injection system allowed for very rapid establishment of a single-phase solution of blowing agent and polymeric material. The injection system included an air-actuated control valve to precisely meter a mass flow rate of blowing agent at rates from 0.2 to 50 lbs/hr at pressures up to 5500 psi.

The second stage of the screw was also equipped with a deep channel, three-flighted cooling section with broken flights, which provided the ability to cool the polymer melt stream.

The system included, at the end of the extruder, a die adapter and a cylindrical annular die with a gap of 0.34 inch, inner diameter of 0.4 inch, and land length of 2 inches. The die adapter was equipped with taps for measurement of melt temperature and pressure just prior to entry into the die.

The system included instrumentation allowing measurement of pressure and temperature of the melt stream at least 7 locations throughout the system between a location just prior to the blowing agent injection ports to the point of entry into the die to precisely monitor material conditions. Along the screw, melt temperature was measured with infrared equipment to avoid disruption of the melt stream.

A standard homopolymer resin, Solvay's HB 1301, having a nominal melt flow index of 5g/10 min., was used as the base resin. Talc concentrate consisting of pellets having 40 percent by weight of talc dispersed in a homopolymer polypropylene matrix (Montell Astryn 65F4-4) were blended with the HB 1301 using a loss-in-weight type blending system to produce a mixture containing 5% by weight of talc (12.5% talc concentrate). This mixture was then gravity fed from a hopper into the extrusion system. Primary screw speed was 50 RPM, giving a total output of approximately 54 lbs/hr of material. Barrel temperatures were set to maintain a melt temperature of 422 deg. F. measured at the end of the extruder. $CO_2$ blowing agent was injected at a rate of 0.3 lbs/hr resulting in 0.55% blowing agent in the melt. A die adapter was attached to the discharge of the extruder, connecting to a cylindrical annular die having a gap of 0.025 inches with an outer diameter of 0.18 inches and a land length of 0.15 inches. Pressure profile between the injection ports and the inlet of the die was maintained between 2430 and 3540 psi. The pressure drop rate across the die was 11.2 GPa/s.

Figure 8:
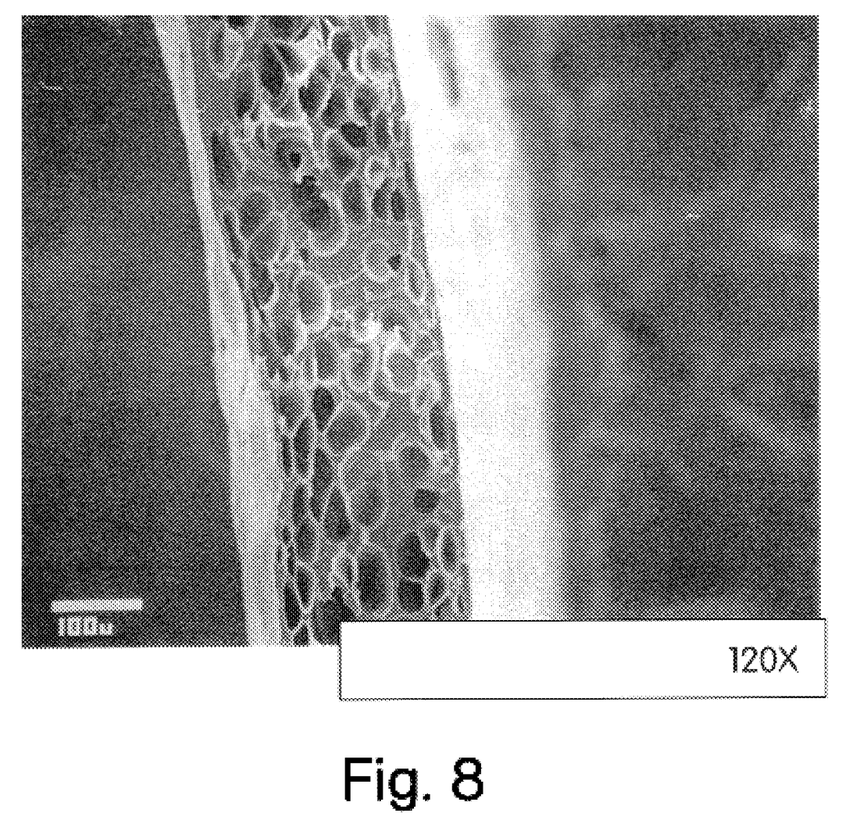
FIG. 8 is a photocopy of an SEM micrograph of a cross-section of the material produced in Example 5.

FIG. 8 is a photocopy of an SEM image of the cross section of the extrudate, showing generally spherical cells approximately 50 microns in diameter dispersed throughout the cross section of the tube wall. Wall thickness of the product was approximately 0.008 inch (0.21 mm). Product outer diameter was about 0.26 inch (6.60 mm). Material density was approximately 0.51 g/cm$^3$ (32 lbs/ft$^3$).

Example 5 illustrates the production of thin microcellular polypropylene material using a mid-level amount of talc as a nucleating agent, while utilizing a relatively low amount of blowing agent and a relatively high pressure drop rate.

EXAMPLE 6

Microcellular Polypropylene 3% Talc Filled Tubular Product

A resin formulation having the same base PP resin grade as Example 5, but with 3% of talc (7.5% talc concentrate) was blended and gravity fed from a hopper into the extrusion system. Primary screw speed was 50 RPM, giving a total output of approximately 54 lbs/hr of material. Barrel temperatures were set to maintain a melt temperature of 427 deg. F. measured at the end of the extruder. $CO_2$ blowing agent was injected at a rate of 0.27 lbs/hr resulting in 0.5% blowing agent in the melt. A die as described in Example 5 was attached to the discharge of the extruder. Pressure profile between the injection ports and the inlet of the die was maintained between 2650 and 3900 psi. The pressure drop rate across the die was 12.4 GPa/s.

Figure 9:
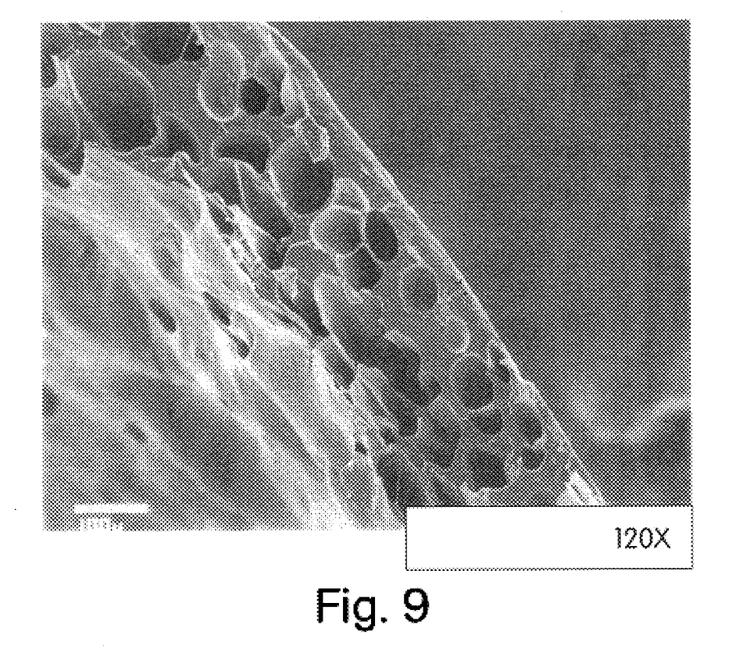
FIG. 9 is a photocopy of an SEM micrograph of a cross-section of the material produced in Example 6.

FIG. 9 is a photocopy of an SEM image of the cross section of the extrudate, showing generally spherical cells approximately 60 microns in diameter dispersed throughout the cross section of the tube wall. Wall thickness of the product was approximately 0.010 inch (0.25 mm). Product outer diameter was about 0.26 inch (6.60 mm). Material density was approximately 0.52 g/cm$^3$ (32.4 lbs/ft$^3$).

The material produced in Example 6 has a larger average cell size compared to the material produced in Example 5 due to the presence of less nucleating agent in Example 6.

EXAMPLE 7

Non-Microcellular Polypropylene 1% Talc Filled Tubular Product

A resin formulation having the same base PP resin grade as Example 5, but with 1% of talc (2.5% talc concentrate) was blended and gravity fed from a hopper into the extrusion system. Primary screw speed was 50 RPM, giving a total output of approximately 54 lbs/hr of material. Barrel temperatures were set to maintain a melt temperature of 428 deg. F. measured at the end of the extruder. $CO_2$ blowing agent was injected at a rate of 0.48 lbs/hr resulting in 0.9% blowing agent in the melt. A die as described in Example 5 was attached to the discharge of the extruder. Pressure profile between the injection ports and the inlet of the die was maintained between 2600 and 3880 psi. The pressure drop rate across the die was about 12.4 GPa/s.

Figure 10:
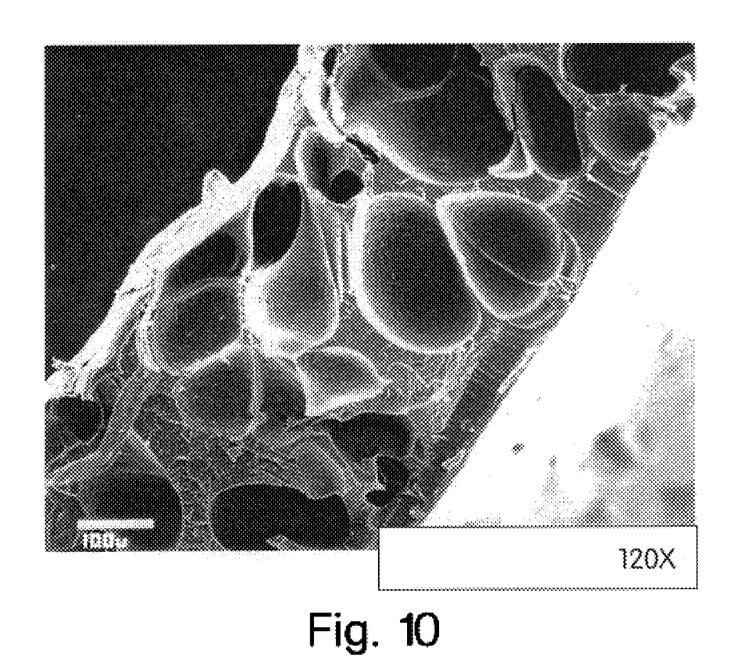
FIG. 10 is a photocopy of an SEM micrograph of a cross-section of the material produced in Example 7.

FIG. 10 is a photocopy of an SEM image of the cross section of the extrudate, showing generally spherical cells approximately 150 microns in diameter dispersed throughout the cross section of the tube wall. Wall thickness of the product was approximately 0.018 inch (0.46 mm). Product outer diameter was about 0.26 inch (6.60 mm). Material density was approximately 0.53 g/cm$^3$ (33.1 lbs/ft$^3$).

The material produced in Example 7 with less than a mid-level range of nucleating agent (1% talc) is non-microcellular.

Examples 8–11

High-Density Polyethylene Microcellular Foam

A tandem extrusion line including a 2½ inch 32:1 L/D single screw primary extruder (Akron Extruders, Canal Fulton, Ohio) and a 3 inch 36:1 L/D single screw secondary extruder (Akron Extruders, Canal Fulton, Ohio) was arranged in a parallel configuration. A volumetric feeder capable of suppling up to 30 lb/hr was mounted in the feed throat of the primary extruder such that compounded talc additive pellets could be metered into the primary extruder. An injection system for the injection of $CO_2$ into the secondary was placed at approximately 8 diameters from the inlet to the secondary. The injection system included 4 equally spaced circumferential, radially-positioned ports, each port including 176 orifices, each orifice of 0.02 inch diameter, for a total of 704 orifices. The injection system included an air actuated control valve to precisely meter a mass flow rate of blowing agent at rates from 0.2 to 12 lbs/hr at pressures up to 5500 psi.

The screw of the primary extruder was specially designed screw to provide feeding, melting and mixing of the polymer/talc concentrate followed by a mixing section for the dispersion of blowing agent in the polymer. The outlet of this primary extruder was connected to the inlet of the secondary extruder using a transfer pipe of about 24 inches in length.

The secondary extruder was equipped with specially designed deep channel, multi-flighted screw design to cool the polymer and maintain the pressure profile of the microcellular material precursor, between injection of blowing agent and entrance to a gear pump (LCI Corporation, Charlotte, N.C.) attached to the exit of the secondary. The gear pump was equipped with an integral jacket for heating/cooling and sized to operate at a maximum output of 250 lb/hr with a rated maximum discharge pressure of 10,000 psi.

The system was equipped, at exit from the gear pump, with a die adapter and a vertically mounted blow molding die (Magic Company, Monza, Italy). The die adapter was equipped with taps for measurement of melt temperature and pressure just prior to entry into the die. The blow molding head included a conventional spider type flow distribution channel and a die adjustment system that allowed movement of the die relative to the fixed position tip providing a variety of exit gaps depending on the chosen tooling.

The above described system was used to produce microcellular HDPE foam samples including a mid-level range of nucleating agent as illustrated in Examples 8–11. The processing conditions and the resulting product characteristics for Examples 8–11 are summarized as follows:

|  | Example 8 | Example 9 | Example 10 | Example 11 |
| --- | --- | --- | --- | --- |
| Talc % | 2.5 | 6.5 | 2.5 | 5.0 |
| Gas Type | $CO_2$ | $CO_2$ | $N_2$ | $N_2$ |
| Gas % | 1.3 | 1.3 | 0.33 | 0.33 |
| Melt Temp (° F.) | 311 | 311 | 318 | 318 |
| Output (lb/hr) | 120 | 120 | 217 | 218 |
| dP/dt (GPa/s) | 3.9 | 3.9 | 3.5 | 3.5 |
| Cell Size (μm) | 53 | 29 | 50 | 34 |

What is claimed is:

1. A polymeric article comprising:
   a matrix of polymeric material including a plurality of cells and having an average cell size of less than 60 microns,
   the polymeric material comprising a semi-crystalline polymer, and a nucleating agent in an amount between about 2.5 and about 7 weight percent, by weight of the polymeric material.

2. The polymeric article of claim 1, wherein the average cell size is less than about 50 microns.

3. The polymeric article of claim 1, wherein the average cell size is less than about 20 microns.

4. The polymeric article of claim 1 having a void volume of greater than 10%.

5. The polymeric article of claim 1 having a void volume of greater than 20%.

6. The polymeric article of claim 1 having a void volume of greater than 50%.

7. The polymeric article of claim 1 having a void volume of less than 50%, and greater than 10%.

8. The polymeric article of claim 1, wherein the polymer matrix comprises between about 5 weight percent and about 7 weight percent of nucleating agent, by weight of the polymeric material.

9. The polymeric article of claim 1, wherein the polymeric material comprises a polyolefin.

10. The polymeric article of claim 9, wherein the polymeric material comprises polypropylene.

11. The polymeric article of claim 9, wherein the polymeric material consists essentially of polypropylene.

12. The polymeric article of claim 9, wherein the polymeric material comprises high-density polyethylene.

13. The polymeric article of claim 9, wherein the polymeric material comprises at least 80% high-density polyethylene by weight polymeric material.

14. The polymeric article of claim 9, wherein the polymeric material comprises at least 90% high-density polyethylene by weight polymeric material.

15. The polymeric article of claim 9, wherein the semi-crystalline polymer consists essentially of high-density polyethylene.

16. The polymeric article of claim 12, wherein the polymer matrix is essentially free of residual chemical blowing agent and reaction-by-products of chemical blowing agent.

17. The polymeric article of claim 1, wherein the nucleating agent comprises an inorganic solid.

18. The polymeric article of claim 1, wherein the nucleating agent comprises a filler.

19. The polymeric article of claim 1, wherein the nucleating agent comprises talc.

20. The polymeric article of claim 1, wherein the cells are primarily closed cells.

21. The polymeric article of claim 1, wherein the polymeric article comprises a thermoformed article.

* * * * *